(12) United States Patent
Chiang et al.

(10) Patent No.: US 10,085,204 B2
(45) Date of Patent: Sep. 25, 2018

(54) DATA TRANSMISSION SYSTEM AND COMMUNICATION METHOD

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chi-Kang Chiang, New Taipei (TW); Wei-Ting Lin, New Taipei (TW); Ru-Me Na Jiang, Shenzhen (CN); Al-Guo Cheng, Shenzhen (CN); Ko-Yi Lee, New Taipei (TW); Ping-Chuan Tsai, New Taipei (TW); Jing-Hu Song, Shenzhen (CN); Shuo-Hsiu Chang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/716,544

(22) Filed: May 19, 2015

(65) Prior Publication Data
US 2016/0278005 A1  Sep. 22, 2016

(30) Foreign Application Priority Data
Mar. 19, 2015  (CN) .......................... 2015 1 0120500

(51) Int. Cl.
*H04W 48/18* (2009.01)
*H04W 12/08* (2009.01)
(Continued)

(52) U.S. Cl.
CPC ........... *H04W 48/16* (2013.01); *H04W 4/008* (2013.01); *H04W 4/80* (2018.02); *H04W 12/06* (2013.01); *H04W 12/08* (2013.01); *H04W 48/20* (2013.01)

(58) Field of Classification Search
CPC ..... H04B 5/02; G06K 19/0723; G06K 7/0008
(Continued)

(56) References Cited

U.S. PATENT DOCUMENTS

2014/0219262 A1  8/2014 Sun et al.
2014/0355063 A1  12/2014 Jang et al.
(Continued)

FOREIGN PATENT DOCUMENTS

CN  102904301  1/2013

*Primary Examiner* — Edward Urban
*Assistant Examiner* — Ralph H Justus
(74) *Attorney, Agent, or Firm* — ScienBiziP, P.C.

(57) ABSTRACT

A data transmission system includes a device and a base. The base includes a near field communication (NFC) module and a processing module configured to determine whether a wireless network exits. The NFC module includes a determining unit configured to determine whether the NFC module writes a predetermined tag after the processing module determines the wireless network exits and configured to determine whether the predetermined tag is an authorization code, a sending unit configured to send a service set identifier (SSID) and a password to the device after the predetermined tag is the authorization code, and a control unit configured to switch an input mode of the base to a wireless network mode after the SSID and the password are sent to the device. The device is configured to be connected to the wireless network after receiving the SSID and the password. A communication method is also provided.

19 Claims, 4 Drawing Sheets

(51) Int. Cl.
  *H04W 48/16* (2009.01)
  *H04W 4/00* (2018.01)
  *H04W 4/80* (2018.01)
  *H04W 12/06* (2009.01)
  *H04W 48/20* (2009.01)

(58) Field of Classification Search
  USPC ........................................................ 455/41.1
  See application file for complete search history.

(56) References Cited

U.S. PATENT DOCUMENTS

2015/0288207 A1* 10/2015 Walker, Jr. ............ H02J 7/0044
                                                              320/114
2016/0150357 A1*  5/2016 Jung ................... H04W 76/023
                                                              455/41.1
2016/0165384 A1*  6/2016 Amano ................ H04W 4/008
                                                              455/41.1

* cited by examiner

DATA TRANSMISSION SYSTEM AND COMMUNICATION METHOD

CROSS-REFERENCE TO RELATED APPLICATIONS

This application claims priority to Chinese Patent Application No. 201510120500.3 filed on Mar. 19, 2015, the contents of which are incorporated by reference herein.

FIELD

The subject matter herein generally relates to a communication method and a data transmission system between two electronic devices.

BACKGROUND

Both all-in-one machines and the desktop computers comprise a display and a base. The base is configured to support the display. The base cannot communicate with other electronic devices.

BRIEF DESCRIPTION OF THE DRAWINGS

Implementations of the present technology will now be described, by way of example only, with reference to the attached figures.

DETAILED DESCRIPTION

Figure 1:
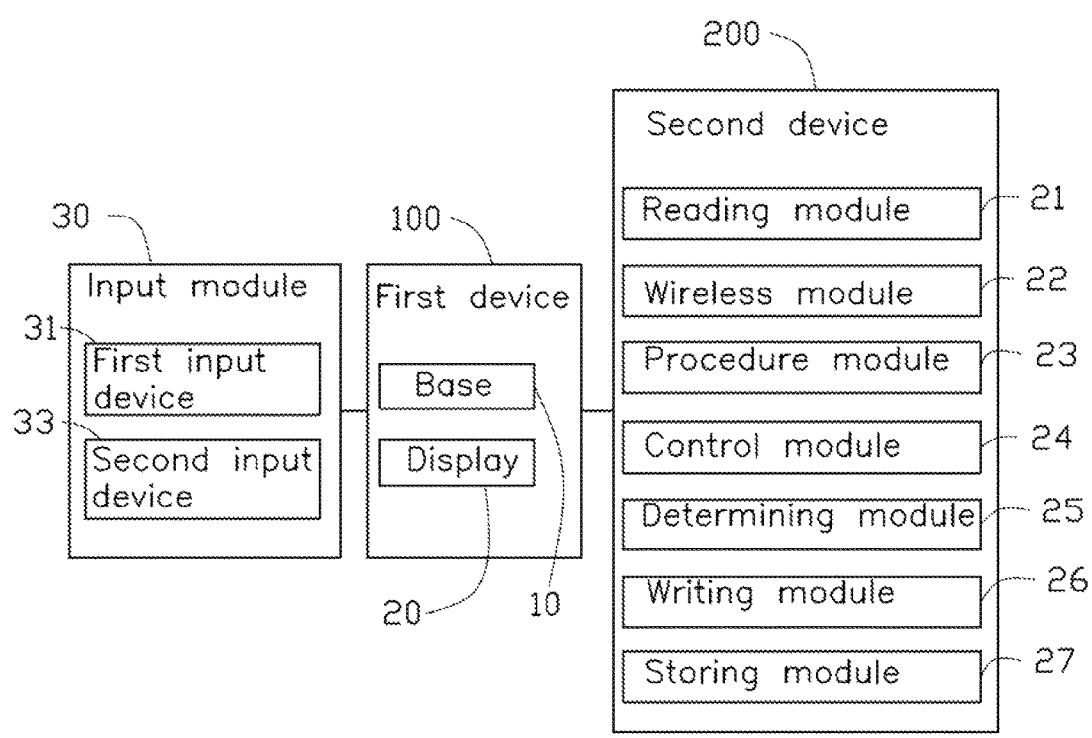
FIG. 1 is a block diagram of one embodiment of a data transmission system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series, and the like.

The present disclosure is described in relation to a base with a communication method used in a computer for communicating with another electronic device.

FIG. 1 illustrates an embodiment of a data transmission system. The data transmission system comprises a first device 100 and a second device 200. The first device 100 comprises a base 10 and a display 20. The base 10 is configured to support the display 20. The first device 100 is configured to receive instructions from an input module 30. Each of the first device 100 and the second device 200 comprises a near field communication (NFC) chip. The first device 100 is configured to communicate with the second device 200 via the NFC chips. In one embodiment, the second device 100 can be an all-in-one machine or a desktop computer, the second device 200 is a portable terminal, such as a mobile phone.

The second device 200 comprises a reading module 21, a wireless module 22, a procedure module 23, a control module 24, a determining module 25, a writing module 26, and a storing module 27. The storing module 27 is configured to store authorization code, and a service set identifier (SSID) and a password of a wireless network.

The input module 30 is configured to input instructions to the first device 100. The input module 30 comprises a first input device 31 and a second input device 33. In one embodiment, the first input device 31 is a BLUETOOTH® mouse, the second input device 33 is a BLUETOOTH® keyboard. The input module 30 is configured to input instructions to control the second device 200 when the first device 100 is communicating with the second device 200.

Figure 2:
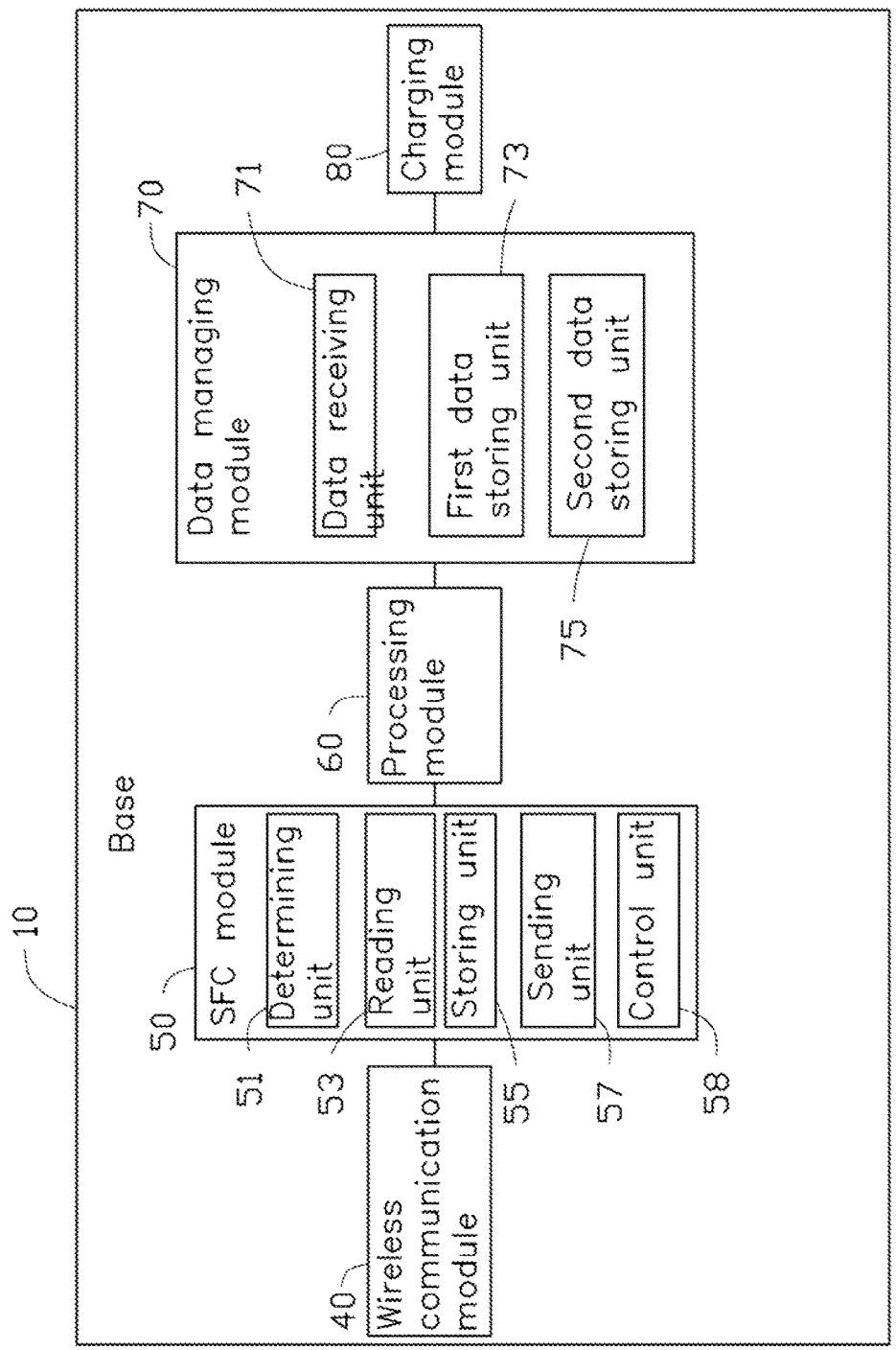
FIG. 2 is a block diagram of a base of the data transmission system of FIG. 1.

FIG. 2 illustrates that the base 10 comprises a wireless communication module 40, a NFC module 50, a processing module 60, a data managing module 70, and a charging module 80. In one embodiment, the charging module 80 is a wireless charging module and is configured to charge the second device 200.

The NFC module 50 comprises a determining unit 51, a reading unit 53, a storing unit 55, a sending unit 57, and a control unit 58. The reading unit 53 is configured to read data from the second device 200. The storing unit 55 is configured to store the data from the reading unit 53, the SSID and the password of the wireless network. The sending unit 57 is configured to send the data to the data managing module 70. The data managing module 70 comprises a data receiving unit 71, a first data storing unit 73, and a second data storing unit 75. The data receiving unit 71 is configured to receive the data from the sending unit 57. The processing module 60 is configured to write a product serial number corresponding to the first device 100 to a predetermined tag and is configured to write the predetermined tag to the first data storing unit 73. The first data storing unit 73 is configured to store the predetermined tag. The second data storing unit 75 is configured to store data from the data receiving unit 71. In one embodiment, the first data storing unit 73 is a flash memory and the second data storing unit 75 is a non-volatile random access memory (NVRAM).

When the first device 100 is communicating with the second device 200, the procedure module 23 is switched on. The procedure module 23 searches for a first device 100 with a NFC chip. After the procedure module 23 searches the first device 100, the reading module 21 reads the product serial number of the predetermined tag. The control module 24 writes code according to the predetermined tag. The determining module 25 determines whether the predetermined tag matches a code rule. The writing module 26 writes authorization code to the storing module 27 after the determining module 25 determines the code matches the code rule. The determining module 25 determines whether the second device 200 is in a wireless network state. The control module 24 controls the wireless module 22 to be switched on after the second device 200 is in the wireless network state. The reading module 21 reads the SSID and the password from the storing module 27. The determining module 25 determines whether the SSID and the password are correct. After the SSID and the password have been determined correct, the control module 24 confirms the second device 200 to be connected to the wireless network.

A switch (not shown) of the display 20 is switched on. The processing module 60 writes the product serial number corresponding to the first device 100 to the predetermined tag and writes the predetermined tag to the first data storing unit 73. The wireless communication module 40 detects whether the wireless network exists. The determining unit 51 determines whether an input signal exists in the first device 100 after the wireless communication module 40 detects the wireless network exists. The determining unit 51 determines whether the predetermined tag is written after an input signal exists in the first device 100. The determining unit 51 determines whether the predetermined tag matches the authorization code after writing the predetermined tag. The sending unit 57 sends the SSID and the password to the storing unit 55 after the determining unit 51 determines the predetermined tag matches the authorization code. The control unit 58 switches an input mode of the first device 100 to a wireless network mode. The display 20 is configured to display a result.

After the first device 100 communicates with the second device 200, a data transmission occurs between the second device 200 and the first device 100 via BLUETOOTH or Miracast. The second data storing unit 75 is configured to store data from the second device 200. The second device 200 can output pictures to display 20 to display via mobile high-definition link (MHL). The first input device 31 and the second input device 33 are operated to control the second device 200. The display 20 displays the result via on-screen display (OSD).

Figure 3:
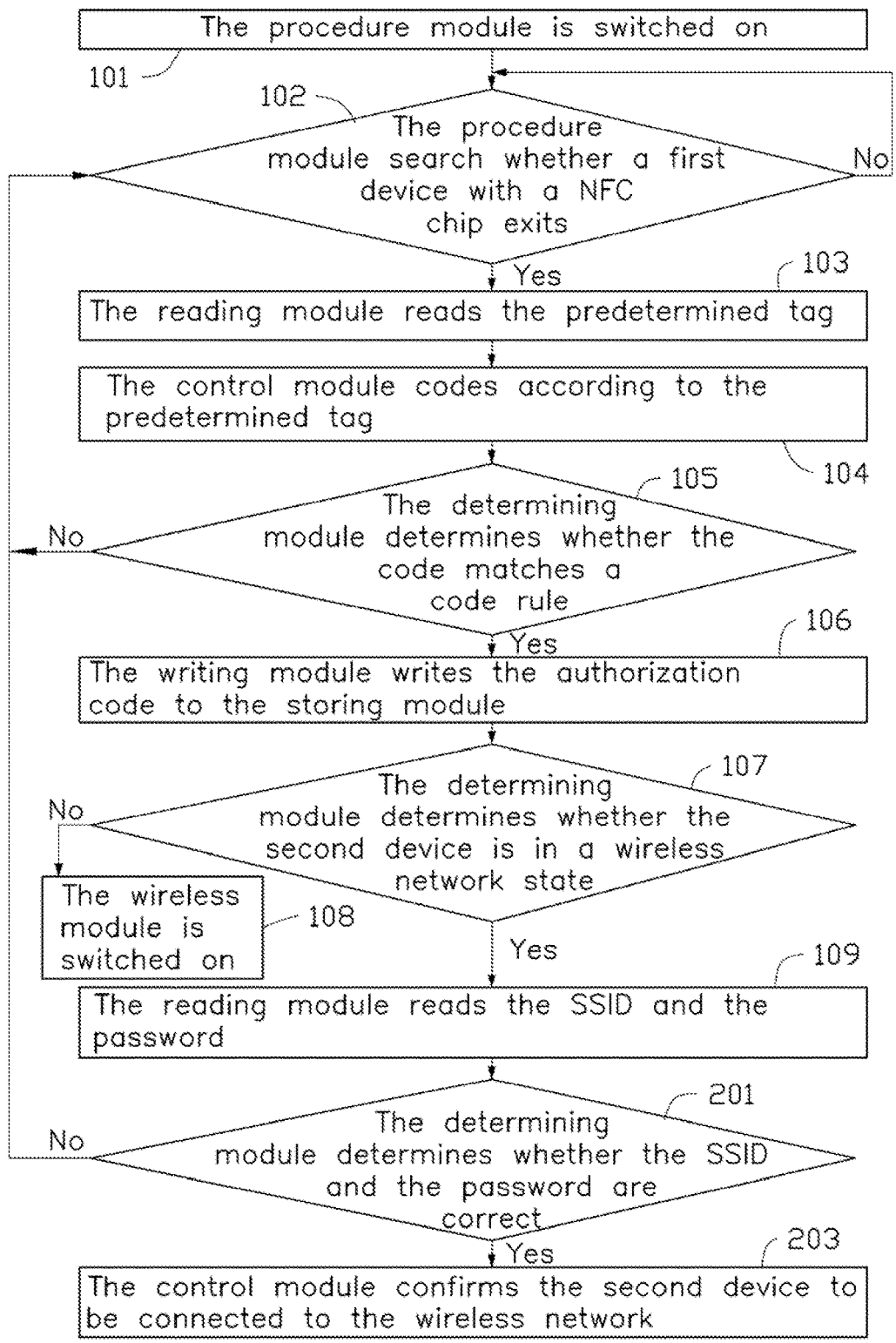
FIG. 3 is a flowchart of one embodiment of a communication method in a first device.

FIG. 3 illustrates a flowchart in accordance with an example embodiment. A communication method in a first device is provided by way of example, as there are a variety of ways to carry out the method. The communication method described below can be carried out using the configurations illustrated in FIGS. 1 and 2, for example, and various elements of these figures are referenced in explaining communication method. Each block shown in FIG. 3 represents one or more processes, methods, or subroutines carried out in the communication method. Furthermore, the illustrated order of blocks is by example only and the order of the blocks can change. Additional blocks may be added or fewer blocks may be utilized, without departing from this disclosure. The communication method can begin at block 101.

At block 101, the procedure module 23 is switched on.

At block 102, the procedure module 23 searches for a first device 100 with a NFC chip, if yes, the method goes to block 103; if no, the method goes to block 102.

At block 103, the reading module 21 reads the predetermined tag.

At block 104, the control module 24 encodes according to the predetermined tag.

At block 105, the determining module 25 determines whether the code matches a code rule, if yes, the method goes to block 106; if no, the method goes to block 102.

At block 106, the writing module 26 writes the authorization code to the storing module 27.

At block 107, the determining module 25 determines whether the second device 200 is in a wireless network state, if yes, the method goes to block 109; if no, the method goes to block 108.

At block 108, the wireless module 22 is switched on.

At block 109, the reading module 21 reads the SSID and the password.

At block 201, the determining module 25 determines whether the SSID and the password are correct, if yes, the method goes to block 203; if no, the method goes to block 102.

At block 203, the control module 24 confirms the second device 200 to be connected to the wireless network.

Figure 4:
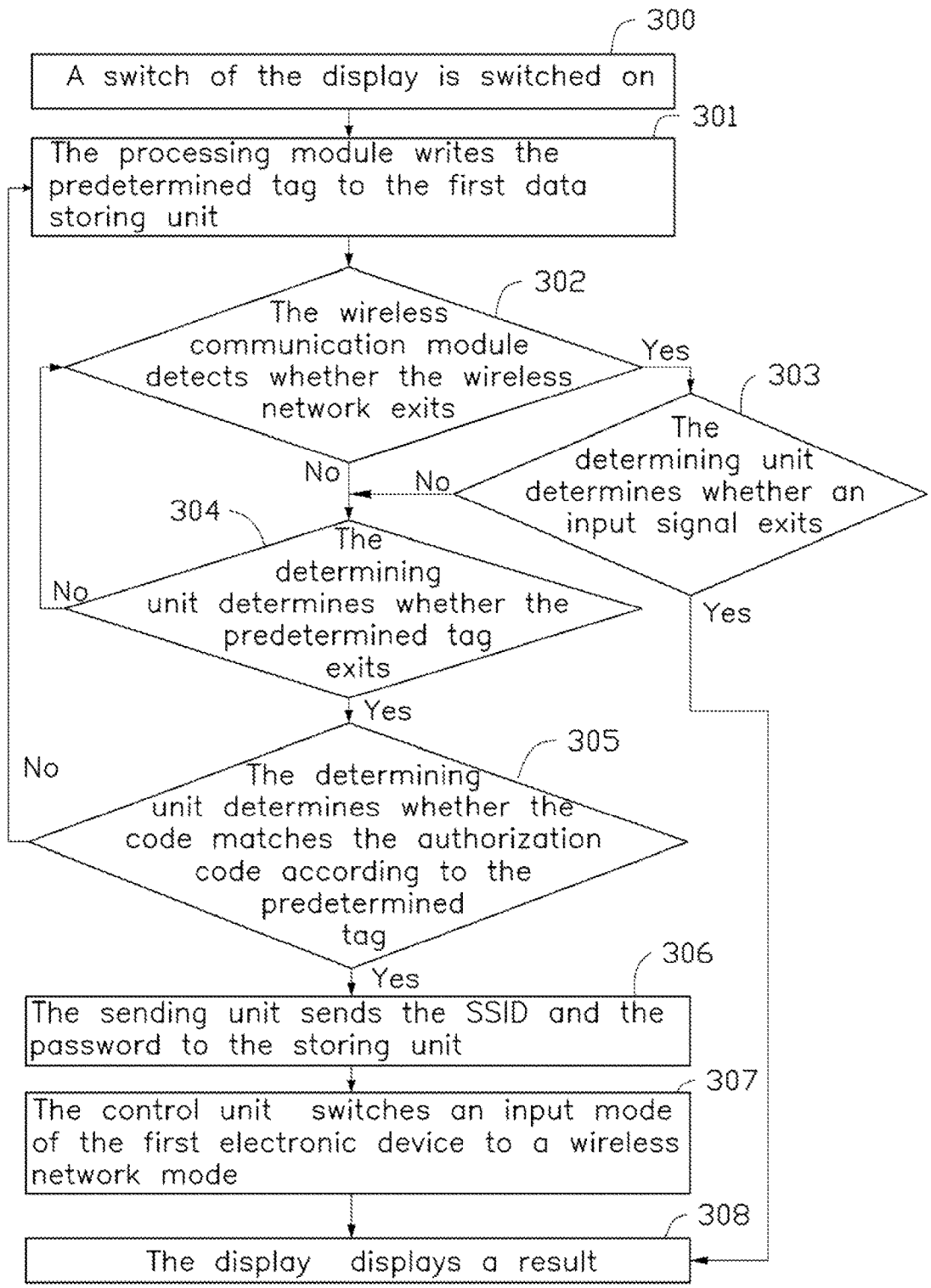
FIG. 4 is a flowchart of the communication method in a second device.

FIG. 4 illustrates a flowchart in accordance with an example embodiment. A communication method in a second device is provided by way of example, as there are a variety of ways to carry out the method. The communication method described below can be carried out using the configurations illustrated in FIGS. 1 and 2, for example, and various elements of these figures are referenced in explaining communication method. Each block shown in FIG. 4 represents one or more processes, methods, or subroutines carried out in the communication method. Furthermore, the illustrated order of blocks is by example only and the order of the blocks can change. Additional blocks may be added or fewer blocks may be utilized, without departing from this disclosure. The communication method can begin at block 300.

At block 300, a switch of the display 20 is switched on.

At block 301, the processing module 60 writes the predetermined tag to the first data storing unit 73.

At block 302, the wireless communication module 40 detects whether the wireless network exits, if yes, the method goes to block 303; if no, the method goes to block 304.

At block 303, the determining unit 51 determines whether an input signal exits in the first device 100, if yes, the method goes to block 308; if no, the method goes to block 304.

At block 304, the determining unit 51 determines whether the predetermined tag is written, if yes, the method goes to block 305; if no, the method goes to block 302.

At block 305, the determining unit 51 determines whether the code matches the authorization code according to the predetermined tag, if yes, the method goes to block 306; if no, the method goes to block 301.

At block 306, the sending unit 57 sends the SSID and the password to the storing unit 55.

At block 307, the control unit 58 switches an input mode of the first device 100 to a wireless network mode.

At block 308, the display 20 displays a result.

In the embodiment, when the first device 100 is communicating with the second device 200, the sending unit 57 sends the SSID and the password to the storing module 27, thus the reading module 21 can read the SSID and the password from the storing module 27. The sending unit 57 sends the predetermined tag to the storing module 27, thus the reading module 21 can read the predetermined tag from the storing module 27.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A data transmission system comprising:
   a first device configured to receive instructions from an input module, the first device comprising:
   a base comprising:

a near field communication (NFC) module having a determining unit, a sending unit, and a control unit; and a processing module; and a second device configured to communicate with the base;

wherein the processing module is configured to determine whether a wireless network exists;

wherein the determining unit is configured to:

determine whether a predetermined tag matches a code rule;

determine whether the NFC module writes the predetermined tag after the processing module determines the wireless network exists and the predetermined tag matches the code rule;

determine whether the predetermined tag corresponds to an authorization code;

wherein the sending unit is configured to send a service set identifier (SSID) and a password of the wireless network to the second device in event that the predetermined tag corresponds to the authorization code;

wherein the control unit is configured to switch an input mode of the base to a wireless network mode in event the sending unit sends the SSID and the password to the second device;

wherein the second device is configured to be connectable to the wireless network upon receiving the SSID and the password of the wireless network;

wherein the input module is further configured to directly control the second device after the first device is communicating with the second device; and wherein the first device is a computer and the second device is a mobile phone.

2. The data transmission system of claim 1, wherein the second device comprises a procedure module configured to search for the base.

3. The data transmission system of claim 2, wherein the second device further comprises a control module configured to write codes according to the predetermined tag in event the procedure module searches the base.

4. The data transmission system of claim 3, wherein the second device further comprises a writing module configured to write the authorization code in event the control module writes the codes.

5. The data transmission system of claim 4, wherein the second device further comprises a determining module, the determining module is configured to determine whether the SSID and the password are correct in event the writing module writes the authorization code, and the control module is configured to confirm the second device is connected to the wireless network after the SSID and the password have been determined correct.

6. The data transmission system of claim 1, wherein the base further comprises a data managing module, the processing module is configured to determine whether the wireless network exists after writing the predetermined tag to the data managing module.

7. The data transmission system of claim 6, wherein the data managing module comprises a first data storing unit and a second data storing unit, the first data storing unit is configured to store the predetermined tag, and the second data storing unit is configured to store a data that the second device outputs to the base.

8. The data transmission system of claim 7, wherein the first data storing unit is a flash memory.

9. The data transmission system of claim 1, wherein the base further comprises a charging module, the charging module is a wireless charging module and is configured to charge the second device.

10. A data transmission system comprising:

a first device configured to receive instructions from an input module, the first device comprising:

a display;

a base configured to support the display and having a near field communication (NFC) module and a processing module; and a second device;

wherein the NFC module comprising a determining unit, a sending unit, and a control unit;

wherein the processing module is configured to determine whether a wireless network exists;

wherein the determining unit is configured to:

determine whether a predetermined tag matches a code rule;

determine whether the NFC module writes the predetermined tag after the processing module determines the wireless network exists and the predetermined tag matches the code rule;

determine whether the predetermined tag corresponds to an authorization code;

wherein the sending unit is configured to send a service set identifier (SSID) and a password of the wireless network to the second device in event that the predetermined tag corresponds to the authorization code;

wherein the control unit is configured to switch an input mode of the first device to a wireless network mode in event that the sending unit sends the SSID and the password to the second device;

wherein the second device is configured to be connectable to the wireless network upon receiving the SSID and the password of the wireless network;

wherein the display is configured to display a result;

wherein the input module is further configured to directly control the second device after the first device is communicating with the second device; and wherein the first device is a computer and the second device is a mobile phone.

11. The data transmission system of claim 10, wherein the second device comprises a control module and a writing module, and the writing module is configured to write the authorization code after the control module writes codes.

12. The data transmission system of claim 11, wherein the second device further comprises a procedure module, the procedure module is configured to search for the first device, and the control module is configured to write the codes according to the predetermined tag after the procedure module searches the first device.

13. The data transmission system of claim 11, wherein the second device further comprises a determining module, the determining module is configured to determine whether the SSID and the password are correct after the writing module writes the authorization code, and the control module is configured to confirm the second device to be connected to the wireless network after the SSID and the password have been determined correct.

14. The data transmission system of claim 10, wherein the base further comprises a data managing module, the processing module is configured to determine whether the wireless network exists after writing the predetermined tag to the data managing module.

15. The data transmission system of claim 14, wherein the data managing module comprises a first data storing unit and a second data storing unit, the first data storing unit is configured to store the predetermined tag, and the second data storing unit is configured to store a data that the second device outputs to the base.

16. The data transmission system of claim 15, wherein the first data storing unit is a flash memory.

17. The data transmission system of claim 10, wherein the base further comprises a charging module, the charging module is a wireless charging module and is configured to charge the second device.

18. A communication method comprising:
   determining whether a predetermined tag matches a code rule;
   determining whether a wireless network exists;
   determining whether a near field communication (NFC) module writes the predetermined tag and whether the predetermined tag matches an authorization code after the predetermined tag matches the code rule and the wireless network exists;
   sending a service set identifier (SSID) and a password of the wireless network to a second device;
   switching an input mode of a first device to a wireless network mode;
   connecting the second device to the wireless network;
   controlling the second device to communicate with the first device;
   wherein the first device is configured to receive instructions from an input module;
   wherein the input module is further configured to directly control the second device after the first device is communicating with the second device; and
   wherein the first device is a computer and the second device is a mobile phone.

19. The communication method of claim 18, further comprising:
   determining whether the SSID and the password are correct and confirming the second device to connect to the wireless network after the SSID and the password have been determined correct.

* * * * *